United States Patent [19]
McCulloh

[11] 3,987,746
[45] Oct. 26, 1976

[54] PARASAIL LAUNCHING AND RETRIEVING APPARATUS

[75] Inventor: Mark McCulloh, Key Biscayne, Fla.

[73] Assignee: Sun Sports Corporation of America, Miami, Fla.

[22] Filed: Sept. 22, 1975

[21] Appl. No.: 615,421

[52] U.S. Cl. ............................ 114/235 R; 115/6.1; 244/155 A; 254/190 R
[51] Int. Cl.² ......................................... B63B 21/56
[58] Field of Search ................ 114/235 R, 235 WS; 244/153 R, 155 R, 155 A; 115/7, 6, 6.1

[56] References Cited

UNITED STATES PATENTS

| | | | |
|---|---|---|---|
| 2,821,726 | 2/1958 | Correll | 114/235 WS |
| 2,915,259 | 12/1959 | Force | 114/235 WS |
| 3,295,793 | 1/1967 | Renart | 244/153 R |
| 3,326,175 | 6/1967 | Baker | 114/235 WS |
| 3,358,399 | 12/1967 | Waldmann | 244/153 R |

Primary Examiner—Trygve M. Blix
Assistant Examiner—Gregory W. O'Connor
Attorney, Agent, or Firm—Salvatore G. Militana

[57] ABSTRACT

Parasail launching and retrieving apparatus adapted to be mounted on a vehicle such as a boat having a tower for supporting a rotatable and pivoted main boom and outrigger boom. The outrigger boom supports the parachute when not in flight and the main boom has a line extending along its full length, one end being connected to a powered winch and the other end having a harness for supporting a person desiring to engage in the sport of parasailing. Upon the person being connected to the harness and the boat moving forwardly at a sufficient speed to permit the billowing of the parachute, the line is payed out and the parachute becomes airborne carrying the parasailor. When it is time to retrieve the parachute the winch is energized to reel in the line as the boat speed is progressively decreased until the parachute is in close proximity to the boat. Then the outrigger boom is extended to engage the canopy of the parachute while the person is deposited in the boat and he is then unhooked from the harness.

10 Claims, 7 Drawing Figures

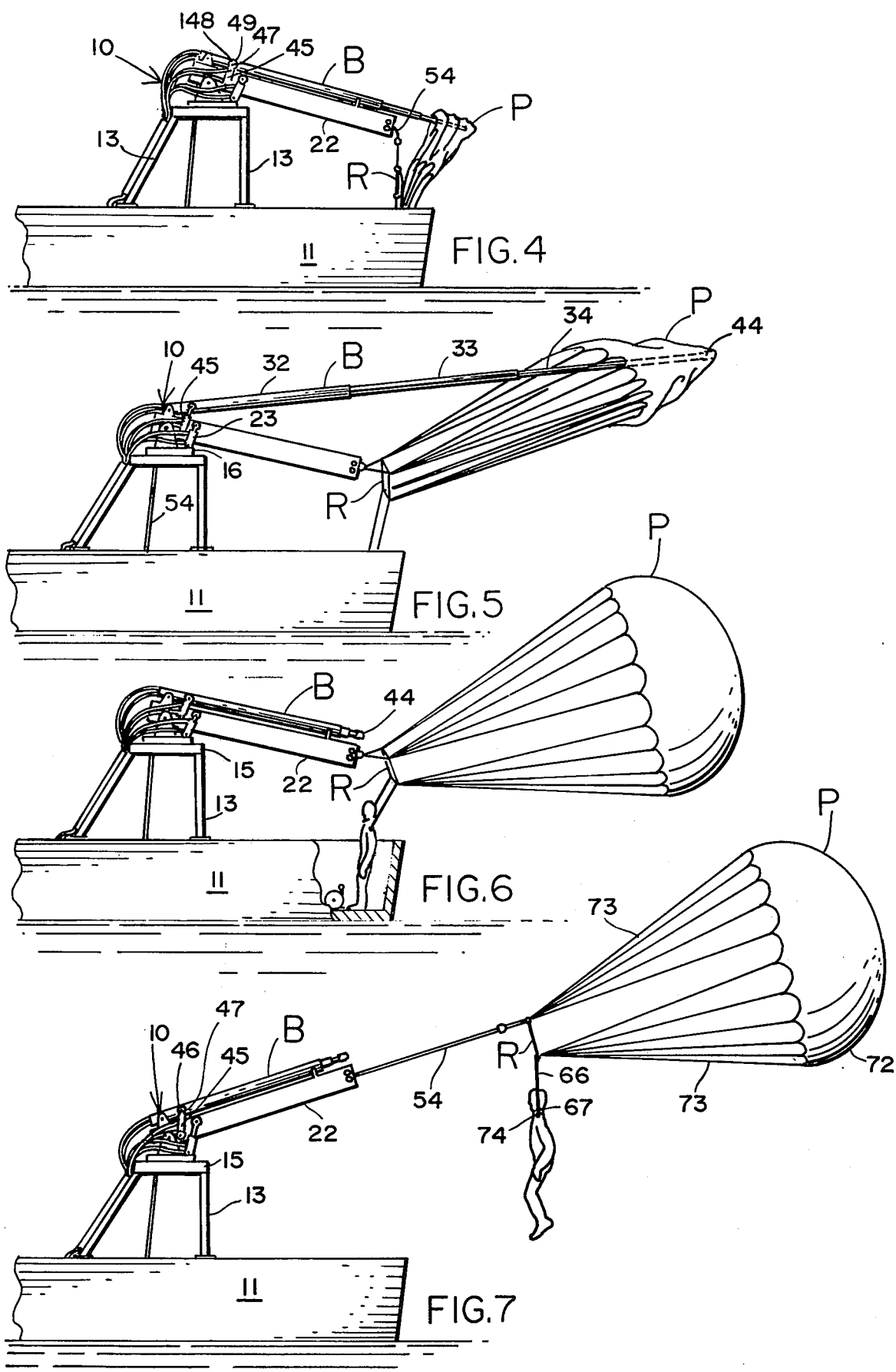

3,987,746

PARASAIL LAUNCHING AND RETRIEVING APPARATUS

BACKGROUND OF THE INVENTION

1. Field Of The Invention

This invention relates to sports apparatus and is more particularly directed to apparatus for launching and retrieving a parachute in the sport of parasailing.

2. Description Of The Prior Art

The sport of parasailing is of such recent innovation that the persons indulging in this sport have no equipment that they can use that has been designed for this particular sport. Consequently, these persons use equipment designed for similar sports such as water skiing and sky diving along with as many attendants that are necessary to launch and retrieve a person and his parasail. This lack of proper equipment has resulted in a great deal of unwarranted serious injury to the participants in this sport which can be dangerous even with the best of equipment. Also, it has been noted that a great deal of time and effort are required in order to ready the equipment and person for launching. It is contemplated by the present invention to provide proper equipment for parasailing that reduces to a minimum the possibility of injury to the participants during the launching and retrieving of the parasailors, and requires very little time and effort to launch and retrieve the parasail and the person during each cycle of operation with a different person.

BRIEF SUMMARY OF THE INVENTION

Therefore, a principal object of the present invention is to provide a launching and retrieving apparatus that is most effective for readily, safely and effectively launching and retrieving a person partaking of the sport of parasailing.

Another object of the present invention is to provide a parasail launching and retrieving apparatus that is adapted to be mounted on a vehicle such as a boat and the like wherein the equipment in its non-use condition is ready for use thereby requiring very little time and effort to strap the person on the apparatus and launch him and the parasail in a safe manner.

A further object of the present invention is to provide a parasail launching and retrieving apparatus that is simple in construction, readily operated by a single person to secure an individual to the harness and launch the canopy as well as to retrieve the canopy and the person quickly and safely.

A still further object of the present invention is to provide a parasail launching and retrieving apparatus mountable on a vehicle such as a boat and the like wherein the power required to operate the various parts of the apparatus is normally found to be available on the boat.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

BRIEF SUMMARY OF THE SEVERAL VIEWS OF THE DRAWINGS

In the drawings:

FIG. 4 is a side elevational view of apparatus with the parasail in place thereon.

FIGS. 5–7 inclusive are similar views showing the progressive steps in the launching of the parasail, the figures in reverse order are the progressive steps in the retrieving of the parasail.

DETAILED DESCRIPTION OF THE PREFERRED EMBODIMENT

Figures 1, 2, 3:
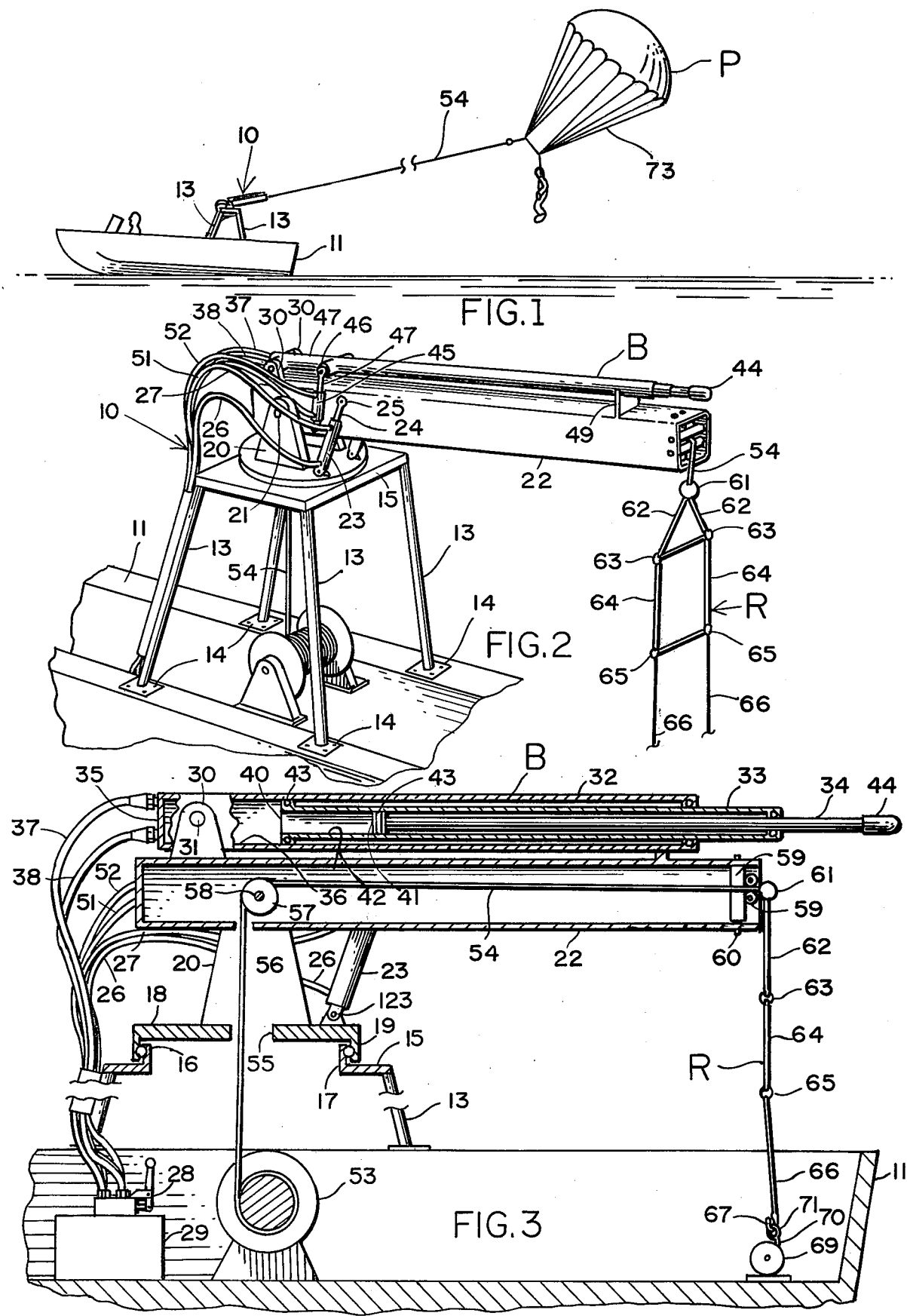
FIG. 1 is a perspective view of a person who is parasailing and using my launching and retrieving apparatus shown mounted in a boat.
FIG. 2 is an enlarged perspective view of my apparatus when not in use showing the boat only in part.
FIG. 3 is a longitudinal cross sectional view of my apparatus.

Referring to the drawings wherein like numerals are used to designate similar parts throughout the several views, the numeral 10 refers generally to my parasail launching and retrieving apparatus shown mounted on a boat 11. Although the boat 11 is used as the towing facility, any vehicle may be used so long as it is capable of travelling at a sufficient speed to maintain the parasail —P— aloft as desired despite the vicissitudes of wind force and direction. My apparatus 10 is provided with a tower consisting of a plurality of legs 13 secured at their lower ends to plates 14 fastened to the boat gunwale. Mounted on the top of the legs 13 is a stationary platform 15 at the center of which is a bearing support collar 16 extending about an opening 17. Mounted over the opening 17 is a rotatable platform 18 having a depending peripheral flange 19 with bearings 50 positioned between the flange 19 and collar 16 for readily rotating the platform 18 on which the launching and retrieving booms are mounted as explained hereinafter.

A pair of spaced apart pivot pin support plates 20 extends upwardly of the rotatable platform 18 with a pivot pin 21 rotatably mounted thereon extending transversely of an elongated hollow boom 22. The launching boom 22 is positioned between the support plates 20 and extends forwardly thereof for vertical swinging movement therebetween. The vertical swinging movement of the launching boom 22 is effected by a pair of conventional hydraulic cylinders 23 pivotally secured as at 123 at their lower ends. There is a piston rod 24 slidably positioned in the cylinders 23 and connected at their outer end to a pivot pin 25 secured to the boom 22. Hoses 26 and 27 are connected at either end of the cylinder 23 permitting fluid under pressure to flow at either side of a piston (not shown) mounted on the inner end of the piston rods 24 and positioned within the cylinders 23. The other ends of the hoses 26 and 27 are connected to a control device 28 which in turn is connected to a pump 29 or other source of fluid under pressure.

A second pair of spaced apart and upwardly extending pivot pin support plates 30 are mounted on the inboard end of the boom 22. A pivot pin 31 is rotatably mounted on the support plates 30 and extending through a tubular member 32 forming the base member of the outrigger boom —B—. Telescopically mounted in the tubular member 32 is a second tubular member 33 and telescopically mounted in the tubular member 33 is a further tubular member 34. The free end of the base tubular member 32 is closed off by a wall 35 to form a chamber 36 to which fluid inlet hose 37 and fluid outlet hose 38 are connected. The inner end of the tubular member 33 is provided with an end wall 39 having a centrally disposed opening 40 to permit fluid under pressure in the chamber 36 to flow therethrough. The further tubular member 34 is provided with a solid end wall 41 thereby forming an enclosed chamber 42 within the tubular member 33. The inner ends of the tubular members 33 and 34 are provided with a resilient collar 43 which engage the inner surfaces of their adjoining tubular members 33 and 32 so as to render the chambers 36 and 42 airtight. When air under pressure is permitted to enter the chamber 36 by way of hose 37, the tubular members 33 and 34 will slide outwardly to an extended position. When air is withdrawn from the chambers 36 and 42 through the hose 38, the tubular members 33 and 34 will withdraw inwardly of the tubular member 32 to their retracted position. The air hoses 37 and 38 are connected to the control device 28 for air under pressure and under a vacuum. At the end of the tubular member 34 there is a plug 44 mounted thereon.

To elevate and depress the outrigger boom —B— there is provided a cylinder 45 on each side of the boom 22 pivotally secured at its lower end as at 46 to the main boom 22 with a piston rod 47 extending outwardly of the other end of the cylinder. The other end of the piston rods 46 are pivotally secured as at 148 to a collar 49 that extends about the tubular member 32. Like hoses 26 and 27, hoses 51 and 52 are connected to the control device 28 to which the pump 29 is connected and extend to the cylinders 45; the hose 51 being connected to the top portion of the cylinder 45 while the hose 52 is connected to the lower portion of the cylinder 45. When air under pressure flows through the hose 52, the piston (not shown) in the cylinders 45 will rise therein and cause the outrigger boom to become elevated and when air under pressure flows through the hose 51 and into the cylinder 45, the outrigger boom will be depressed and come to rest on a cradle 49 that is mounted on the upper surface of the main boom 22.

Mounted within the boat 11 is a power operated winch 53 having a line or rope 54 extending upwardly through an opening 55 in the rotatable platform 18. The line 54 extends through an opening 56 in the bottom wall of the main boom 22 and loops over a pulley 57 positioned within the main boom 22 and rotatably mounted on a shaft 58 whose ends are secured to the side walls of the boom 22. The line 54 extends through the full length of the main boom 22 being centered therein by two pairs of rollers 59 set at right angles to each other, the rollers 59 being rotatably mounted on shafts 60 secured to the walls of the main boom 22.

To the end of the line 54 there is secured a ball-like member 61 to prevent the line 54 at the ball 61 from being retracted beyond the position of the rollers 59. The ball 61 is connected by lines 62 that extend to rings 63 that are secured to the two upper corners of a parasail rack —R— formed of a plurality of tubular members 64. At the lower corners, there are further rings 65 secured thereto having a line 66 extending from each of them to a hook or clip 67. Mounted within the stern of the boat 11 is a conventional retractable reel 69 consisting of a spool rotatably mounted and fastened to the deck of the boat 11 with a line 70 wound thereon and a ring 71 secured to the end of the line 70. As in conventional retractable reels, when the ring 71 is grasped and pulled upwardly, the line 70 will unwind from the retractable reel 69 and when the ring 71 is released, the reel 69 will automatically rewind the line 70 thereon until the ring 71 has returned to its position against the reel 69. The parachute or parasail —P— which is utilized in connection with my apparatus 10 is provided with a canopy 72 and a plurality of lines 73 extending from the periphery thereof which are divided into four groups, each group being secured to each of the rings 63, 65 of the parachute rack —R— formed by the tubular members 64 ready for launching.

When a person is about to engage in the sport of parasailing, he will wear a vestlike garment or harness which forms no part of the present invention that is provided with a ring 74 on ach shoulder. As he approaches the boat 11 he will find my apparatus 10 in readiness for launching.

On the boat 11 as shown by FIG. 2 ready for launching. The main boom 22 will be in a depressed position with the hooks 67 of the harness engaging the rings 71 of the retractable reel 69. The outrigger boom —B— will be found resting on the cradle 49 in an extended position as shown by FIG. 2 with the canopy portion 73 of the parachute —P— draped over the knob 44 and the parachute shrouds 73 extending toward and fastened to the rings 63 and 65. Now the outrigger boom —B— is extended and raised to the position shown by FIG. 5. This is done by manipulating the proper switches on the control panel 28 to start the pump 29 and permit air under pressure to flow through the hoses 52 into the lower portions of the cylinders 45 to compel the piston rods 47 to slide outwardly and the outrigger boom —B— to pivot upwardly. At the same time air under pressure is permitted to flow through the hose 37 which causes the boom tubular members 33 and 34 to slide outwardly of the tubular member 33 to the position shown by FIG. 5.

The boat 11 with the intended parasailor on board, moves in a forward direction to permit onrushing air to inflate the parachute. The outrigger boom —B— is next retracted by permitting the air to be removed from the tubular members 33, 34 by means of the pump 29 through the hose 38. Also, the outrigger boom —B— is lowered to its resting position on the cradle 49 the flow of air pressure through the hoses 51 to the upper portion of the cylinders 45 to compel the piston 47 to slide downwardly.

At this time, the person designated to be the next parasailor, steps into the cockpit of the boat 11. The rings 71 of the retractable reel 69 is pulled outwardly of the reel and the hooks 74 are removed therefrom and clipped onto the rings 74 on the person's shoulders. The rings 71 are released and the retractable reel 69 will automatically rewind the reel to return the rings 71 back to the reel 69. The now harnassed individual is standing in the boat 11 without endangering himself since the parachute is billowing in the wind but cannot move in a direction away from the boat 11.

The main boom 22 is now elevated by permitting air under pressure to flow through the hoses 27 to enter the lower part of the cylinders 23 and thereby cause the piston rod 24 to slide upwardly and carry with it the boom 22. The individual will at this time be standing on the stern of the boat 11 ready to be airborne. The boat 11 is now made to move forwardly at an appropriate speed and the winch 53 is activated to unreel the line 54 to permit the parachute —P— to be taken up into the air by the force of the oncoming wind created by the forward motion of the boat 11. The line 54 is continued to be payed out until the parasailor is at the desired height and the boat 11 is moving forwardly at a predetermined speed appropriate to maintaining the parasailor aloft. The boom 22 will swing freely in a horizontal plane so as to be always pointing in the direction of the parachute 72 so long as it is aloft.

When it is time to return the parasailor to the boat 11, the winch 53 is now actuated to reel the line 54 onto its spool and the speed of the boat 11 progressively lowered as the parasail —P— is brought closer to the boat 11. When the parasail —P— is close enough to the boat, the outrigger boom —B— is extended in the manner as indicated hereinabove until the knob 44 has engaged the cloth of the parachute 72 and is now supporting the canopy. The main boom 22 is now lowered until the individual is deposited in the boat 11 while simultaneously the outrigger boom —B— is raised to the position shown by FIG. 5 whereby the parachute is supported by the outrigger boom —B—. The boat 11 has been progressively diminishing its speed until now the boat can be stopped as at dockside.

The parasailor is now released from the apparatus 10 by unhooking the clips 67 from the rings 74 that are positioned on his shoulders. The rings 71 of the retractable reel 69 are pulled upwardly to extend the line 70 so that the clips 67 can be made to enagage the rings 71.

If another person is ready to engage in the sport of parasailing, he then enters into the boat 11 and stands in the cockpit ready to be secured to the apparatus 10 in the same manner as described hereinabove. He, of course, has to be wearing the harness type vest which has the rings 74 mounted at his shoulders.

When the apparatus 10 b—to be readied for non-use, then outrigger boom —B— is lowered and retracted simultaneously until the outrigger boom —B— rests on the cradle 49 and the parachute 72 is removed from the outrigger boom —B(—. The parachute 72 may either be stowed in the cockpit of the boat 11 while connected to the rings 63, 65 of the parasail rack —R— or the shrouds 73 may be disconnected from the rings 63, 65 and stowed away separately.

What I claim as new and desire to secure by Letters Patent of the United States is:

1. A parasail launching and retrieving apparatus comprising support means, a main boom secured at one end to said support means, an outrigger boom mounted adjacent said main boom, said outrigger boom having an extensible member for movement of one end of said outrigger boom beyond the other end of said main boom, a line extending along said main boom, means connected at one end of said line for drawing said line along said boom and parasail securing means mounted at the other end of said line and parasail engaging means for supporting said parasail mounted on said one end of said extensible member.

2. The structure as recited by claim 1 wherein said support means comprises horizontally rotatable plate means for horizontal swinging movement and means pivotally mounting said main boom to said rotatable plate means for vertical swinging movement, fastening means secured to said parasail securing means for supporting a person and means mounted on said other end of said line preventing the drawing of said line and said parasail securing means beyond a desired position of said boom.

3. The structure as recited by claim 2 wherein said main boom comprises a substantially elongated hollow member having its other end open, said line passing along the axis of said member and extending through said end and means maintaining said line along said axis.

4. The structure as recited by claim 3 wherein said outrigger boom comprises a substantially elongated member, said extensible member mounted on said main member for sliding one end of said extensible member beyond said open portion of said main boom.

5. The structure as recited by claim 3 wherein said outrigger boom comprises a plurality of elongated members, a first elongated member being hollow, a second elongated member being hollow and telescopically mounted in said first elongated member, a third elongated member being telescopically mounted in said second elongated member and means for extending and retracting said elongated members.

6. The structure as recited by claim 5 wherein said parasail securing means comprises rack means, means connecting said other end of said line to one end of said rack means, and fastening means connected to the other end of said rack means.

7. The structure as recited by claim 6 wherein said rack means comprises a plurality of elongated members formed into a substantially rectangular shape and rings mounted at each corner of said elongated members forming an upper pair and a lower pair, a connecting member secured to said other end of said line, line means connecting said connecting member and said other pair of rings, a line connecting said lower pair of rings and said person supporting means secured to the free end of said last named line.

8. The structure as recited by claim 7 taken in combination with a parasail having a canopy and a plurality of shrouds connected to the periphery of said canopy and said shrouds forming four groups of substantially equal number, each group being secured to each of said rings.

9. The structure as recited by claim 8 taken in combination with a vehicle, means mounting said apparatus on said vehicle, said line drawing means comprising a winch, said person supporting means comprising a hook and means mounted in said vehicle for engaging said hook.

10. The structure as recited by claim 9 wherein said vehicle comprises a boat and said support means comprises a plurality of upwardly extending leg portions, a plate member mounted on said legs and supporting said horizontally rotatable plate means.

* * * * *